(12) United States Patent
Donnelly et al.

(10) Patent No.: US 8,454,826 B2
(45) Date of Patent: Jun. 4, 2013

(54) WATER TREATMENT APPARATUS

(75) Inventors: Vernon J. Donnelly, Bradden (GB);
Vincent J. Garvey, Douglas (GB)

(73) Assignee: Strix Limited, Ronaldsway (ID)

( * ) Notice: Subject to any disclaimer, the term of this patent is extended or adjusted under 35 U.S.C. 154(b) by 2068 days.

(21) Appl. No.: 10/523,848

(22) PCT Filed: Aug. 7, 2003

(86) PCT No.: PCT/GB03/03471
§ 371 (c)(1),
(2), (4) Date: Oct. 17, 2005

(87) PCT Pub. No.: WO2004/014519
PCT Pub. Date: Feb. 19, 2004

(65) Prior Publication Data
US 2006/0169629 A1    Aug. 3, 2006

(30) Foreign Application Priority Data

Aug. 7, 2002  (GB) ................................ 0218318.4

(51) Int. Cl.
*B01D 27/08* (2006.01)
*B01D 24/12* (2006.01)
*B01D 27/02* (2006.01)
*B01D 35/30* (2006.01)
*C02F 1/28* (2006.01)

(52) U.S. Cl.
USPC .......................................... 210/232; 210/282

(58) Field of Classification Search
USPC ........................................... 210/232, 91, 282
See application file for complete search history.

(56) References Cited

U.S. PATENT DOCUMENTS

| 691,655 | A | | 1/1902 | McEvilly et al. |
|---|---|---|---|---|
| 5,002,665 | A | * | 3/1991 | Brueggemann ................ 210/266 |
| 5,076,922 | A | * | 12/1991 | DeAre ........................... 210/282 |
| 5,469,708 | A | | 11/1995 | Harrison et al. ............... 62/3.64 |
| 5,525,214 | A | * | 6/1996 | Hembree ........................ 210/88 |
| 5,609,033 | A | | 3/1997 | Dong ............................. 62/3.64 |
| 5,753,107 | A | * | 5/1998 | Magnusson et al. .......... 210/109 |
| 5,811,004 | A | | 9/1998 | Robertson et al. ............ 210/482 |
| 5,842,353 | A | | 12/1998 | Kuo-Liang ..................... 62/190 |
| 5,873,995 | A | * | 2/1999 | Huang et al. .................... 210/87 |
| 6,003,318 | A | | 12/1999 | Busick et al. ................. 62/3.64 |
| 6,099,735 | A | | 8/2000 | Kelada |
| 6,103,114 | A | * | 8/2000 | Tanner et al. ................. 210/232 |
| 6,123,837 | A | * | 9/2000 | Wadsworth et al. ............ 210/87 |
| 6,178,290 | B1 | | 1/2001 | Weyrauch et al. ............. 392/445 |
| 6,237,345 | B1 | | 5/2001 | Kalman et al. ................ 62/3.64 |
| 2002/0036162 | A1 | | 3/2002 | Magnusson et al. .......... 210/232 |
| 2004/0240324 | A1 | | 12/2004 | Isbitsky et al. ................ 368/327 |
| 2005/0150235 | A1 | | 7/2005 | Scott et al. |

FOREIGN PATENT DOCUMENTS

| EP | 0837290 | 4/1998 | ............................ 1/4 |
|---|---|---|---|
| EP | 1285882 | 2/2003 | |
| JP | 04363191 | 12/1992 | ........................... 1/44 |
| JP | 10034138 | 10/1998 | |
| JP | 11083271 | 3/1999 | |
| WO | WO9741066 | 11/1997 | |
| WO | WO 01/47399 | 7/2001 | ......................... 27/21 |
| WO | WO 02/00552 | 1/2002 | |
| WO | WO 02/26615 | 4/2002 | ........................... 5/62 |

* cited by examiner

OTHER PUBLICATIONS

EP search report for EP11191061.8 dated Jun. 11, 2012.

*Primary Examiner* — Thomas M Lithgow
(74) *Attorney, Agent, or Firm* — O'Shea Getz P.C.

(57) ABSTRACT

A water treatment cartridge has a major and a minor axis in a horizontal cross-section and mounting lugs provided at the upper end of the cartridge, generally aligned with the major axis of the cartridge.

21 Claims, 16 Drawing Sheets

WATER TREATMENT APPARATUS

Applicants hereby claim foreign priority benefits under 35 U.S.C. 8119 of Great Britain Patent Application No. 0218318.4 filed Aug. 7, 2002 and PCT Application No. PCT/GB2003/003471 filed Aug. 7, 2003, the disclosures of which are herein incorporated by reference.

BACKGROUND OF THE INVENTION

1. Technical Field

The present invention relates to water treatment apparatus, more particularly to domestic water treatment cartridges.

2. Background Information

Such products are widely known and are used to improve the taste and odour of domestic water supplies. The cartridge contains a granular treatment medium such as an ionic exchange medium, activated charcoal, minerals and mixtures of these. The treatment medium is retained within the cartridge by grilles provided at the upper and lower ends of the cartridge.

Typically the cartridge sits within an inlet funnel into which tap water is introduced, the tap water then percolating through the cartridge into a collection vessel below. The collection vessel may simply be a jug from which the treated water is dispensed or, as proposed more recently, it may actually be a water heating vessel such as a kettle or the like. Such a proposal is contained in the Applicant's International Patent Application WO 01147399.

The present invention seeks to provide a water treatment cartridge which can be used in either of the above contexts.

In many applications, treated water in its collection vessel may be stored in a refrigerator prior to dispensing. This has led to the collection vessels tending to be elongate having a major and minor axis in plan view, with a handle and pouring spout arranged on the major axis. At the same time, it is desirable, particularly in water heaters, to reduce the overall height of the cartridge to reduce the possibility of the cartridge coming into contact with the heated water either when standing or pouring, and also to keep appliances more compact for stability purposes.

DISCLOSURE OF THE INVENTION

From a first aspect, the invention provides a water treatment cartridge, said water treatment cartridge having a major and a minor axis in a horizontal cross-section, with mounting lugs being provided at the upper end of the cartridge, generally aligned with the major axis of the cartridge.

With such an arrangement, a cartridge can be made in an elliptical shape, for example, whereby it may extend along an elongate water collection vessel and also be less deep than a traditional cartridge, being able to accommodate a greater amount of treatment material within the cartridge body for a given depth due to its elongate major axis.

The invention also extends to a water treating appliance comprising a chamber for receiving untreated water, said chamber having an outflow opening and having a treatment cartridge in accordance with the invention mounted in fluid communication with the opening for receiving water from the chamber for treatment.

Preferably no mounting lugs extend from any other part of the cartridge whereby its minor axis dimension can be kept to a minimum.

Preferably the cartridge is provided with a sealing surface, most preferably a circular sealing surface, arranged radially inwardly of the mounting lugs. This also avoids the need for sealing means extending outwardly of the minor axis of the cartridge.

The invention also extends to a mounting part of or for a water treatment cartridge, said mounting part having a generally circular sealing surface, and having mounting lugs arranged at opposed ends thereof along an elongate direction of the mounting.

The invention also extends to a water treatment cartridge having such a mounting part which may be an integral part thereof or a separate element. Preferably the cartridge body, or at least its mounting part, is generally elliptical in horizontal cross-section. This provides a particularly aesthetic arrangement when used in elongate jugs and the like. However, this is not essential and the body could be circular, rectangular or some other shape in cross section.

Preferably the mounting lugs are planar and extend for a significant distance around the periphery of the cartridge, most preferably at least 15" around the periphery.

Preferably the mounting lugs are arcuate in shape so as to avoid sharp corners which could pierce packaging to the cartridge, thereby destroying sterility of the cartridge.

Preferably the mounting lugs mount the cartridge in a bayonet type fitting. Preferably therefore, the mounting location for the cartridge has a surface to receive the lugs.

Most preferably the lower edge of the lug periphery is chamfered such that as the mounting lug is rotated onto its receiving surface, the chamfer acts to cam the cartridge into sealing engagement with a or the seal. Preferably the chamfer profile is substantially the same around the entire lug periphery.

The cartridge, or at least the lugs thereof, may be made from a plastics material. This, together with the fact that the lugs are at a significant spacing from the centre of the cartridge (being at the ends of the cartridge's major axis) means that they will be able to flex to some degree to maintain pressure on the seal.

Preferably the plastics material is heat resistant so that the cartridge can be used in a water boiling appliance where it will be subject to steam.

Preferably also, the plastics material should be resistant to degradation by gamma radiation which is commonly used to sterilize cartridges.

The Applicant has realized, however, that various plastics such as Samsung HJ730+ and Basell Moplen HP371(Gamma Stabilized) that are not subject to gamma radiation degradation may be used to overcome this problem from a further aspect, therefore, the invention provides a water treatment cartridge comprising a body made of a heat resistant plastics material which does not suffer degradation by gamma radiation.

As an alternative to a plastics material, which can easily scruff, soften in use or become degraded by gamma irradiation or UV (particularly in see through jugs), the cartridge body may be made from metal.

Thus in certain embodiments, the cartridge body may be made from a thin sheet material such as stainless steel or treated aluminium. The sheet material may be drawn into the appropriate shape. Other parts of the cartridge, for example the top of the cartridge, may still be formed in a plastics material.

From a further aspect, therefore, the invention provides a domestic water treatment cartridge comprising a body made at least in part of a thin sheet metal material.

As stated above, it is preferred that the seal between the water treatment cartridge and its mounting is provided inboard of the periphery of the cartridge, and that the seal is preferably circular. This avoids the potential problem that marks or scratches received during handling on a peripheral sealing surface could lead to leakage. Preferably, the cartridge is provided with a sealing surface which cooperates with a resilient seal member provided on the water treatment appliance to affect the seal.

The cartridge sealing surface may be provided on an upwardly, outwardly or inwardly facing surface as appropriate. Preferably, however the sealing surface is provided at least in part on an inwardly facing wall of the cartridge, which wall extends, in use, around a depending wall on the appliance. This arrangement is advantageous in that a seal can be placed on the outer surface of the depending wall, for example merely by stretching it over the wall, possibly retaining it in a groove on that wall.

From a further broad aspect, therefore, the present invention provides a water treatment cartridge comprising a sealing surface arranged inwardly of its periphery, said sealing surface being formed, at least in part, by at least a portion of an inwardly facing, downwardly extending circumferentially continuous wall.

The invention also extends to a water treatment appliance comprising a downwardly depending wall, and a seal mounted on the outwardly facing surface of the wall for engagement with a sealing surface provided on a water treatment cartridge.

A particularly advantageous arrangement is one in which the sealing surface is formed around the corner between an upwardly and inwardly facing surface of the upper part of the cartridge. This allows both radial and axial sealing forces to be exerted on the seal. The corner may be rounded or chamfered to facilitate lead in.

Preferably the inwardly facing wall tapers inwardly from top to bottom whereby it assists in guiding the cartridge into position on the appliance.

From a further broad aspect the present invention provides a water treatment cartridge comprising an upper surface having an inwardly facing downwardly depending wall, said wall being inwardly tapering for guiding the cartridge over a depending wall on an appliance.

Preferably the inwardly facing wall forms the radially outer wall of an annular channel extending around the top of the cartridge. Preferably water inlet openings are provided in the inwardly facing wall.

Preferably water inlet openings are also provided in the radially inner, outwardly facing wall of the channel. In some embodiments, the inner wall has a smaller open area than the outer. The open area of the inner wall is preferably less than 80% of that of the outer wall, more preferably about 65% of that of the outer wall.

This is advantageous in that it admits water over a large area of the cartridge, reducing the likelihood of local dry areas.

From a further aspect the invention provides a water treatment cartridge having an upper surface provided with an annular channel, water inlet openings being provided on at least one wall of, and preferably both the inner and outer walls of, the annular channel.

Preferably the inlet openings are provided in a lower part of the outer wall and at least an upper part of the inner wall. This is advantageous as it will facilitate venting of air from the cartridge through the upper openings as it is filled.

The inlet slots need not extend to the top of the annular channel. However, to prevent air being trapped at the very top of area enclosed by the channel, it is desirable to provide some further vent openings at the top of the enclosed area. Preferably these openings are provided by slots which extend around the upper corner of the enclosed area. This is advantageous in that it provides sufficient venting while at the same time avoiding the need for strengthening of the slots.

One or more ribs may extend across the channel. These ribs may add rigidity to the top of the cartridge, but may also act to vent air from the region radially outwardly of the channel towards vent openings. Preferably a pair of ribs is provided, most preferably aligned with the mounting lugs.

The inlet openings described above should be of sufficiently small dimension to retain the water treatment particles within the cartridge. Preferably they comprise axially extending slots, typically having a width of less that about 0.25 mm. The actual size of the slots will be chosen in dependence on the size of the treatment medium granules used.

In the preferred embodiment, the cartridge comprises a cartridge body whose upper end is closed by a cap which includes water inlet openings, the sealing surface and so on. Preferably the cap is welded, for example ultrasonically welded in position. In order to retain the liquid treatment medium in the cartridge a grille is also provided at the bottom of the container body. This grille may either form the bottom wall of the cartridge or, more preferably, may retain treatment particles away from a restricted opening in the base of the container body, as described in our aforementioned International patent application.

Preferably the lower grille is snap fitted into the container body which is provided with suitable retaining means, for example a retaining lip formed on its inside surface.

A problem which has been identified with such arrangements is that air may become trapped in or around the grille. This is disadvantageous since it potentially blocks the grille, and it can lead to trapped air once released rising through the central part of the body of treatment material, possibly meaning that water will not be able to penetrate into such regions, leaving the treatment material dry. Preferably, therefore, the grille is formed with an upwardly dished outer portion in which air will collect in preference to the grille surface. This portion when arranged within the container body is spaced from the container body such that air can escape between the container body and the dished portion of the grille.

This in itself is a novel and inventive arrangement, so from a yet further aspect, the invention provides a water treatment cartridge comprising a cartridge body and a grille arranged at the base of the body, said grille having a dished outer portion which, when arranged within the container body, is spaced from the container body such that air can escape between the container body and the dished portion of the grille.

The cartridge body is preferably curved in the region at least of the grille, allowing a spacing to be formed between the dished periphery of the grille and the body wall.

Curving the container body also has other benefits. As stated above, it is desirable to keep the treatment cartridge out of contact with treated water within a jug. With traditional cartridges, which are relatively tall, this is meant that the cartridge has to be arranged a significant distance above the water level in the container, lading to a relatively tall container which may be disadvantageous particularly in heating appliances. However, it has been found that by tapering the cartridge body in a curved manner from the top to the bottom of the cartridge the likelihood of a cartridge being wetted when water is poured from the vessel is reduced.

From a further aspect, therefore, the present invention provides a water treatment cartridge having a cartridge body which tapers in a curved manner from the top to the bottom of the cartridge.

The above arrangement also has the advantage that the curve imparts significant stiffness to the cartridge body, meaning that a minimal wall thickness may be used compared to the prior art. This is advantageous in terms of material cost savings.

In the context of a cartridge having a major and minor axes as discussed above then the taper will be preferably aligned with the major axis of the cartridge.

Preferably the curve extends substantially to the centre line of the cartridge. Furthermore, preferably both the "front" and "rear" walls of the cartridge are so tapered so that the cartridge may be inserted in a container in either rotational configuration.

In the context of cartridges being used in liquid heating appliances it may be desirable to vary the flow rate of liquid from the cartridge into the heating vessel in dependence on the heating power of the vessel. For example, in a low wattage element for example 1.2 kilowatts, water will take relatively longer to boil which means that it can flow through the cartridge relatively slowly. To this end, a cartridge with a relatively small outlet orifice may be provided. However, water will boil more quickly with a higher wattage element which means that with a relatively small outlet orifice water may still be passing through the cartridge after water has boiled. This is not desirable and a larger outlet orifice is therefore required for such appliances. Thus different cartridges may be used in different appliances. Accordingly, preferably means are provided on the cartridge which prevents the cartridge being used in an inappropriate appliance.

From a further aspect, therefore, the invention provides a liquid heating appliance comprising a water treatment cartridge, means being provided on the cartridge and on a mounting location for the cartridge to prevent an incorrect cartridge being mounted therein.

These means may include, for example, one or more keys provided in a portion of the cartridge with a complementary key being provided in the mounting location. The keys may take any appropriate shape. For example, in one embodiment the keys could be provided on a peripheral surface of the cartridge, in a mounting lug for the cartridge or on an inner wall of the cartridge.

It will be appreciated that the present invention is applicable to water treatment cartridges for water treatment jugs in which the water treatment cartridges attached to the bottom of a receptacle for water to be treated. It may also be applied to cartridges which are used in liquid heating appliances in which the cartridge is attached to a suitable mount which may be provided on the appliance itself or on a receptacle for receiving water to be treated. In the latter case, the cartridge preferably fits on to a wall of the heating vessel, e.g. the lid of the heating vessel, which is provided with the appropriate sealing means.

That mount will also be provided with sealing means to allow a hopper to be placed on top of the mounting means to supply water to the treatment cartridge. Preferably the mount comprises an inwardly extending resilient lip which seals against a depending wall provided on the hopper to prevent water escaping between the hopper and the mount.

This is in itself a novel arrangement, so from a further aspect, the invention provides a mount for a water treatment cartridge, said mount having means to mount the cartridge and also having a seal for sealing a water receiving hopper receivable thereon.

Preferably the hopper is provided with a valve which is operated when the hopper has entered into sealing engagement with the mount. In a preferred embodiment a top portion of the cartridge acts on the valve to operate it.

From a further aspect the invention provides a water treatment apparatus having a water treatment cartridge mounted in a water receiving vessel which receives a hopper for containing untreated water, said hopper having valve means which is opened by an upper surface of the cartridge when the hopper is placed on the vessel.

The treatment cartridge may have associated with it a counter which can be used to indicate the degree of usage of the cartridge and which is typically incremented every time the cartridge is used. It would be desirable for an automatic mechanism for resetting this counter when the cartridge is removed or replaced.

Preferably the cartridge is provided with means which, upon rotation of the cartridge into or out of position engage with an actuator for resetting the counter.

From a yet further broad aspect therefore the invention provides a water treatment cartridge comprising means which, upon rotation of the cartridge into or out of position engage with an actuator for resetting a usage counter for the cartridge. The invention also extends to a water treatment appliance comprising a counter indication usage of a treatment cartridge, and an actuator for resetting said counter automatically when the cartridge is removed or replaced.

If it is anticipated that a water supply will contain particulate material, then the cartridge may also be provided with a particle filter. This may take the form of one or more porous sheets or members suitably arranged within the cartridge.

BRIEF DESCRIPTION OF THE DRAWINGS

Some preferred embodiments of the invention will now be described with reference to the accompanying drawings in which:

FIG. 23 shows a further embodiment of cartridge in accordance with the invention.

DETAILED DESCRIPTION OF THE INVENTION

With reference to FIGS. 1 to 9 a water treatment cartridge 2 comprises a body 4 which contains a mass of water treatment granules (not shown). The granules may comprise ion exchange particles, activated carbon particles, minerals, other treatment materials or mixtures thereof.

Figure 9:
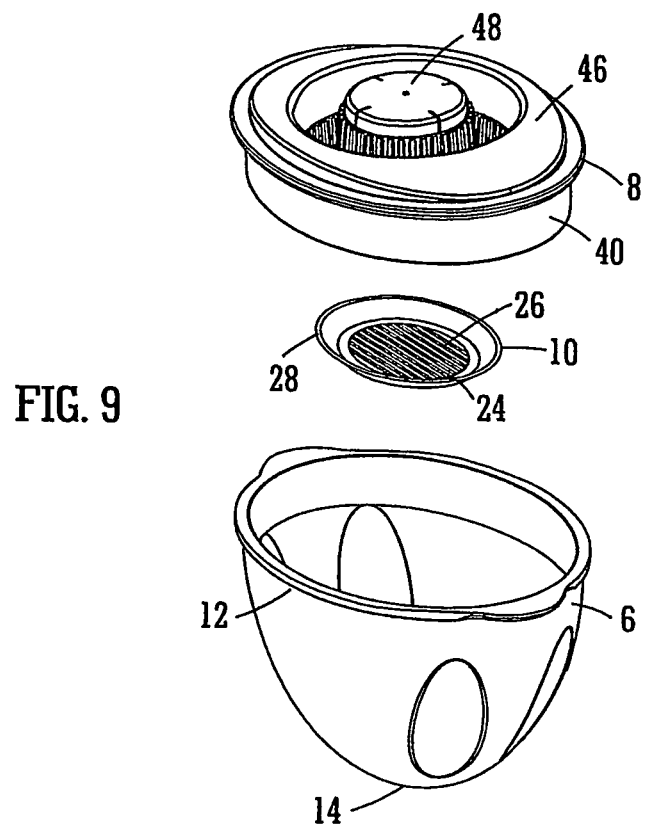
FIG. 9 shows an exploded view of the cartridge of FIG. 1.

As shown in FIG. 9, the cartridge comprises three components, a main body 6, a cap 8 and a grille 10. The cap 8 and grille 10 retain the liquid treatment particles within the cartridge body 6.

The cartridge body 6 is generally elliptical in cross-section, tapering in an arcuate manner from its upper end 12 to its lower end 14. An orifice 16 is provided in the bottom end 14 of the cartridge body 6. As described in our aforementioned International Patent application, this orifice 16 restricts the water flow through the cartridge to give a desired residence time within the cartridge.

The cartridge body 6 is also provided with four indentations 18 which acts as finger grips for a user.

The upper end 12 of the cartridge body 6 is provided with two mounting lugs 20 which serve to mount the cartridge 2 in an appropriate appliance or receptacle. As can be seen from FIG. 2, these lugs are generally arcuate in shape and as can be seen from FIGS. 3 and 8 they have a chamfered outer edge 22. The mounting lugs 20 are arranged aligned with the major axis of the cartridge body 6. The chamfered edge 22 acts to cam the cartridge into position when it is mounted, as will be discussed further below.

Figure 1:
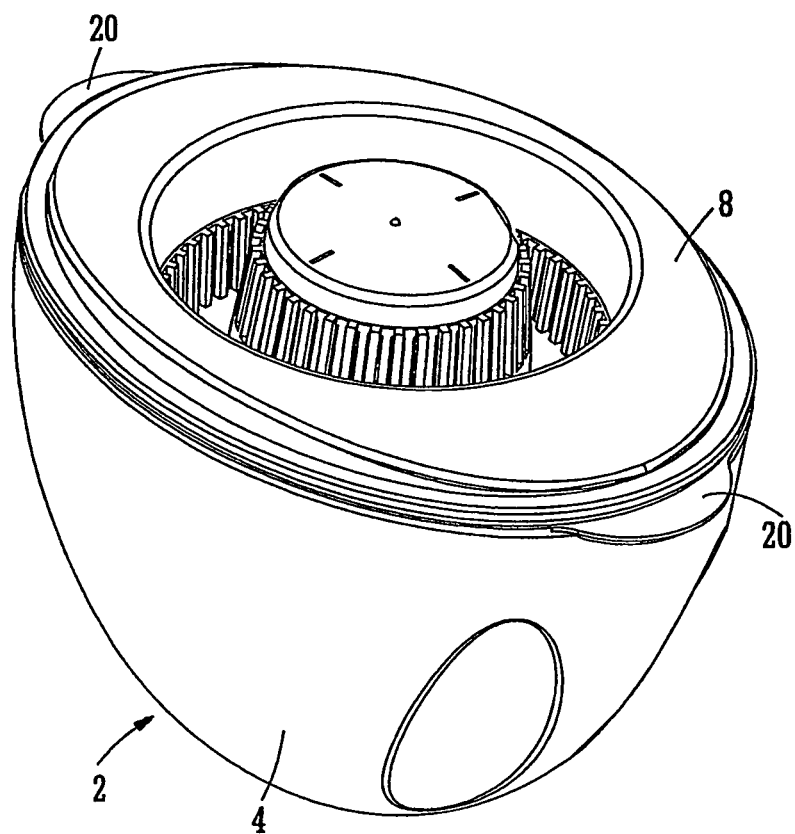
FIG. 1 shows a perspective view of a water treatment cartridge in accordance with the invention.
Figure 2:
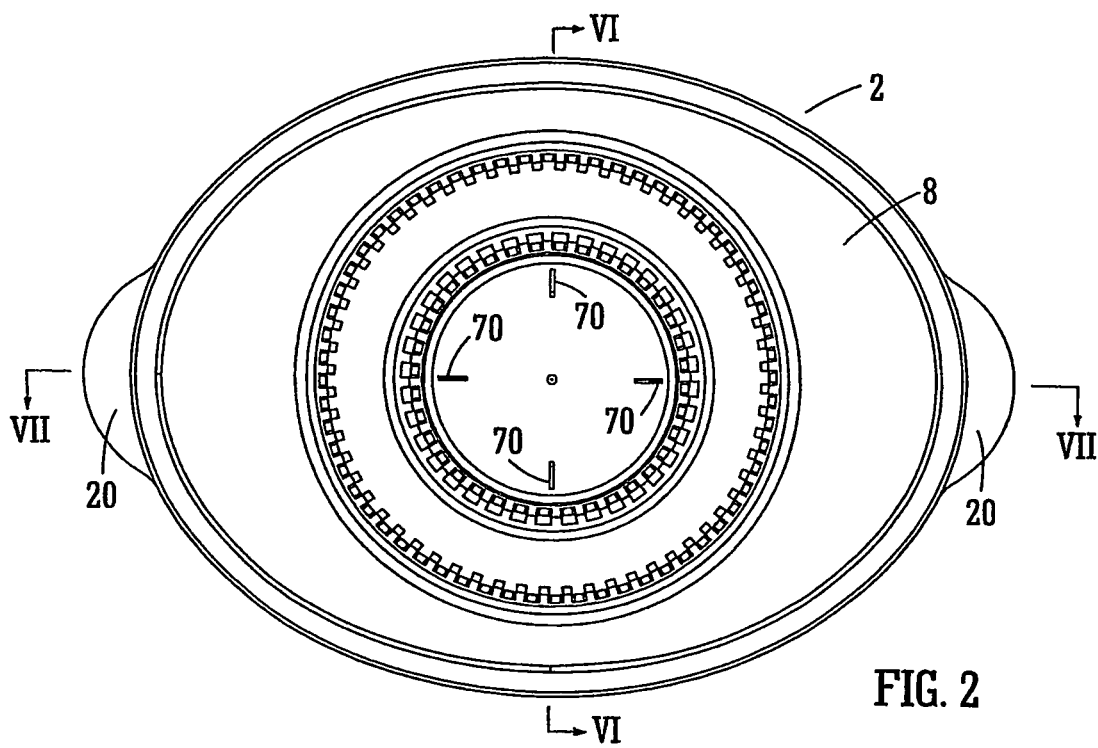
FIG. 2 shows a plan view of the cartridge of FIG. 1.
Figure 3:
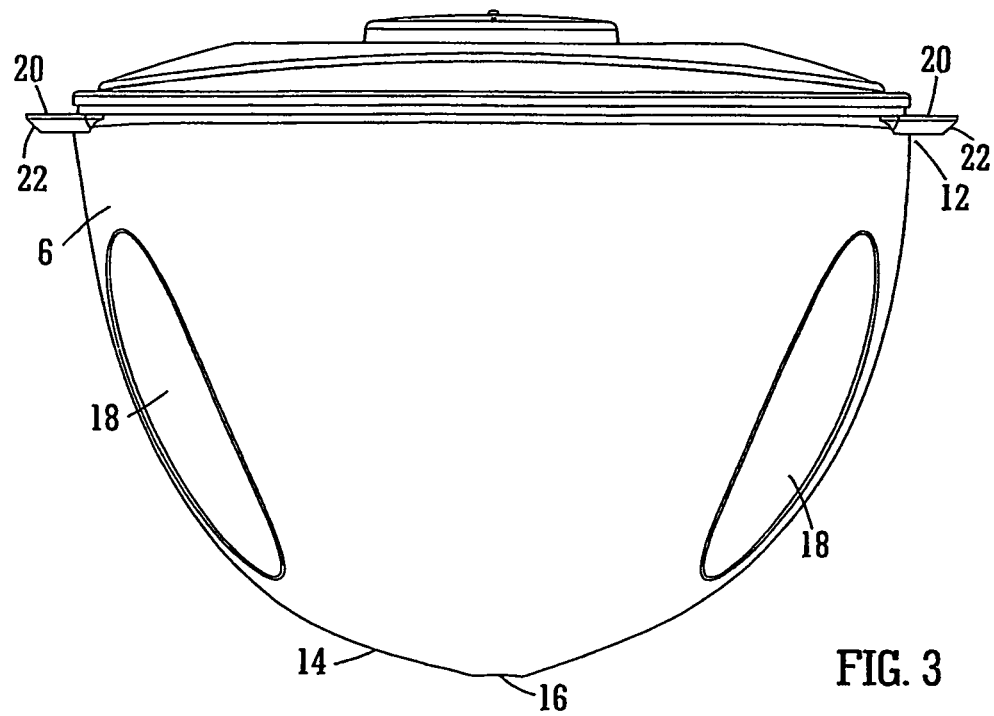
FIG. 3 shows a front view of the cartridge of FIG. 1.
Figure 4:
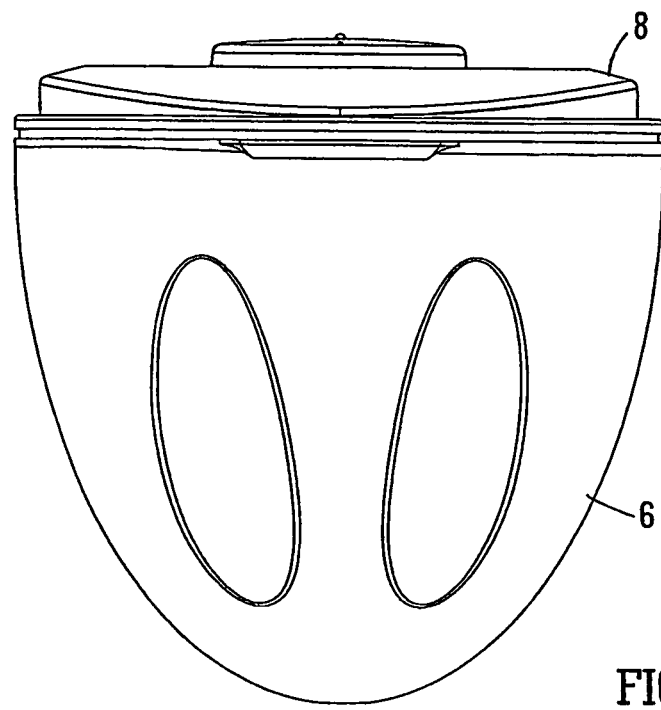
FIG. 4 shows a side view of the cartridge of FIG. 1.
Figure 5:
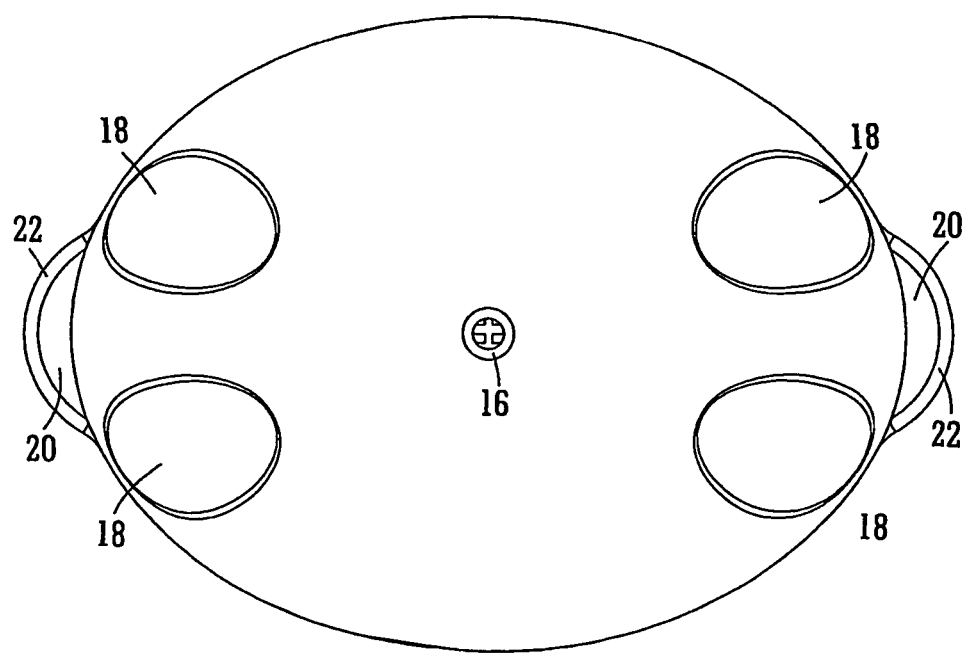
FIG. 5 shows an underneath view of the cartridge of FIG. 1.
Figure 6:
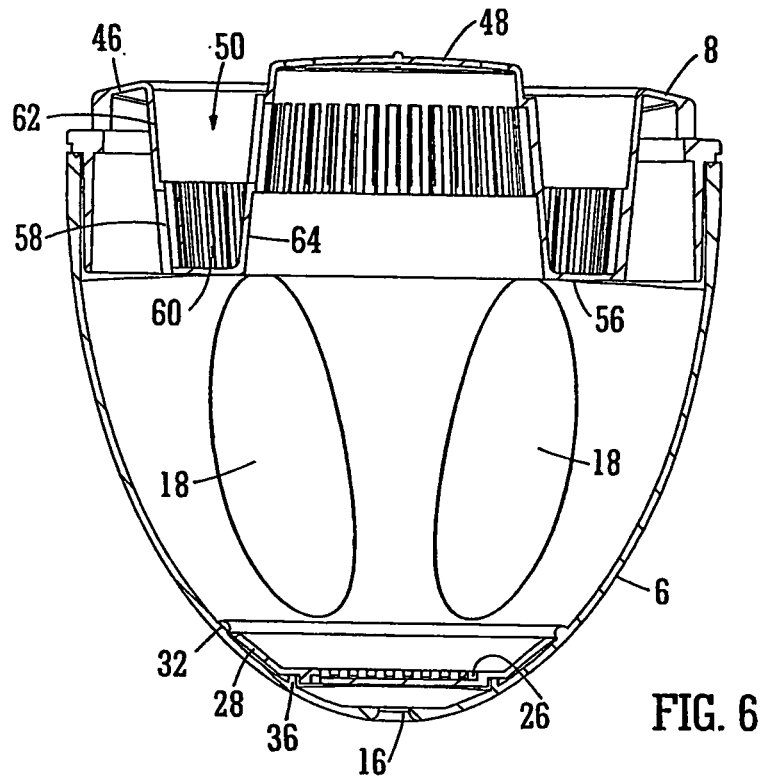
FIG. 6 shows a vertical cross section along the line VI-VI of FIG. 2.
Figure 7:
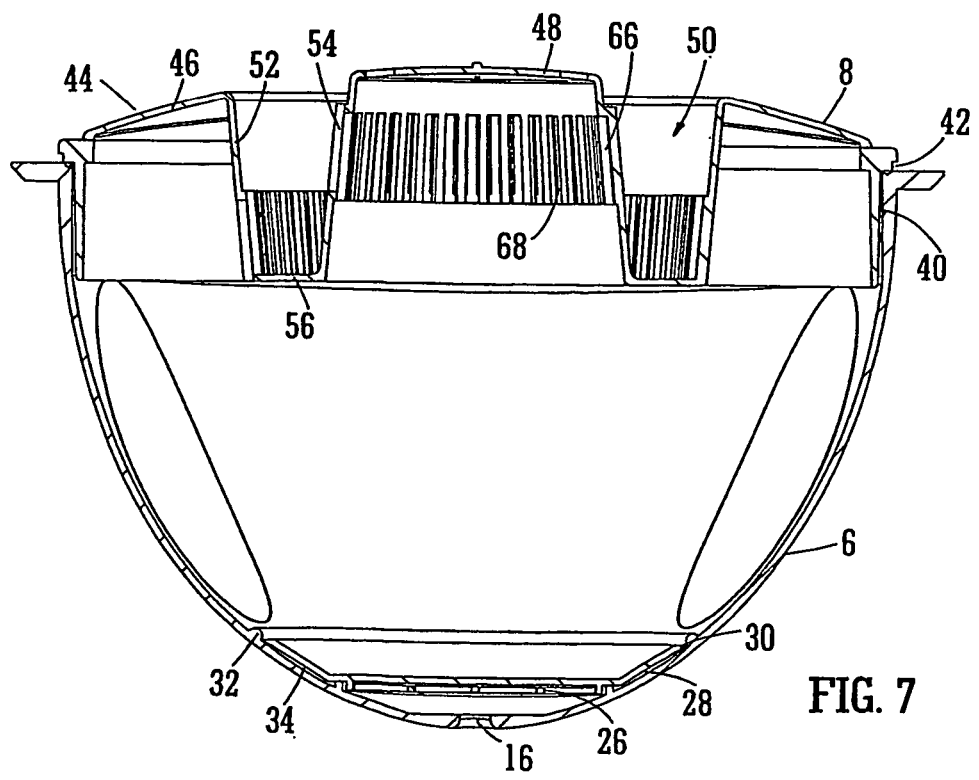
FIG. 7 shows a cross-sectional view along the line VII-VII of FIG. 2.
Figure 8:
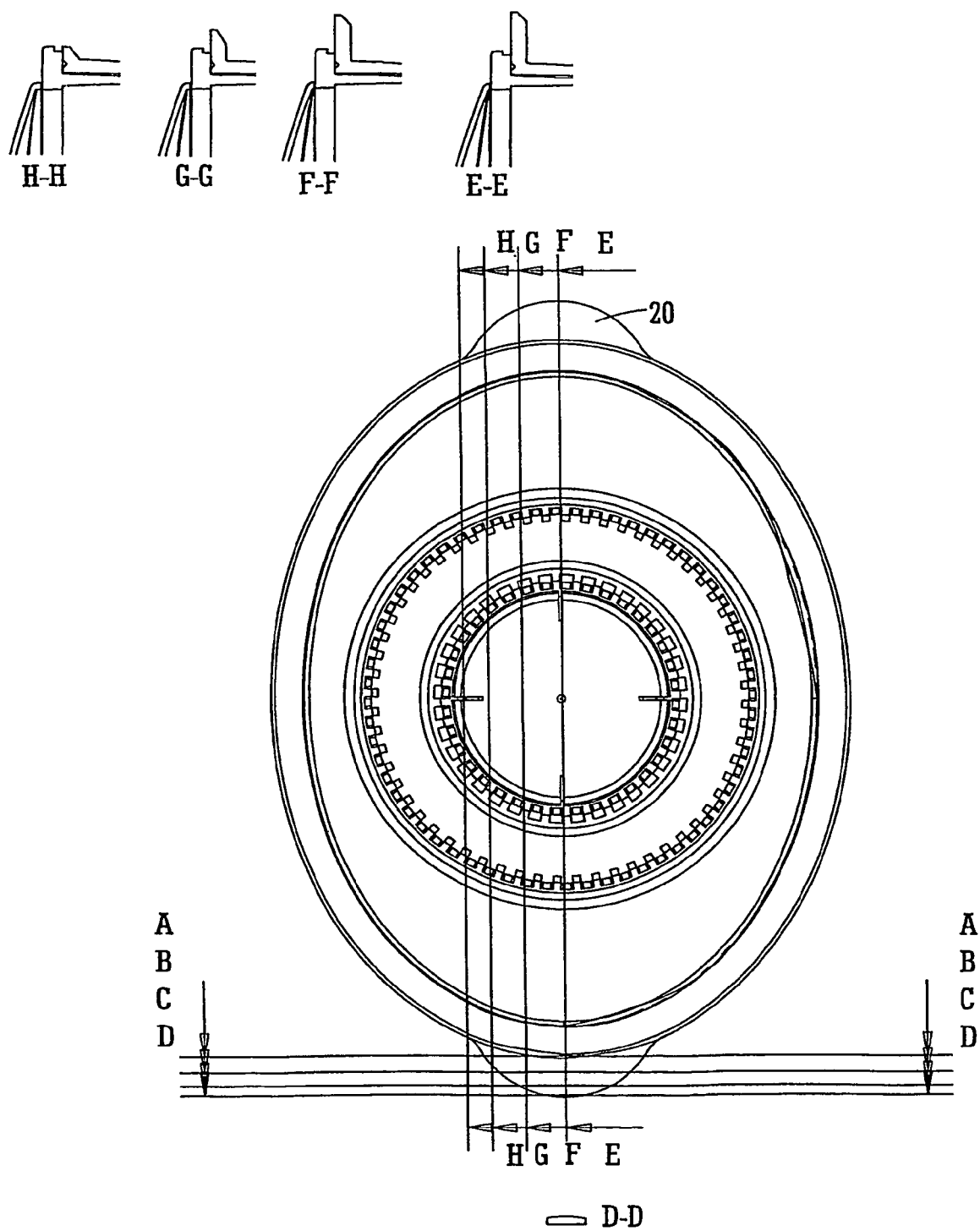
FIG. 8 shows sections along various lines of the mounting lugs of the cartridge of FIG. 1.

As can be seen from FIGS. 6, 7 and 9, the grille 10 comprises a generally planar base 24 which is provided with a plurality of slots 26 of the order of 0.25 mm wide. Support ribs 26 extend across the slots 26 to prevent their deformation thereby preventing treatment particles escaping through the slots 26. Although the grille 10 is shown with slots 26, other shapes of opening may be provided instead of slots.

The peripheral region 28 of the grill 10 is formed to extend upwardly at an angle from the planar base 24. When assembled into the container body 6, the upper edge 30 of the peripheral region 28 snaps in behind a rib 32 extending around the internal surface of the container body 6. The base 24 of the grille 10 locates inside a raised rib 36 provided on the inside of the cartridge body 6.

The cap 8 of the cartridge 2 has a downwardly depending flange 40 which fits inside the upper end 12 of the cartridge body 6. The cap 8 is welded, for example ultrasonically welded, to the upper part 12 of the cartridge body 6 in the region designated generally as 42.

The upper surface 44 of the cap 8 has an outer region 46 free from any openings. A central region 48, is spaced from outer region 46 by an annular channel 50. The channel 50 has a radially outer wall 52, a radially inner wall 54 and a base 56.

As can be seen most clearly in FIGS. 6 and 7, the lower part 58 of the radially outer wall 52 is provided around its entire periphery with a plurality of longitudinally extending slots 60. These slots are approximately 0.25 mm wide. The upper region 62 of the wall 52 is, however, continuous and contains no such slots.

The base 56 of the channel 50 is also continuous with no slots, as is the lower region 64 of the inner wall 54. However, an upper region 66 of the inner wall 54 is also provided with longitudinally extending slots 68 of the same dimensions as those slots 60 in the outer wall 52. The slots 68 do not extend to the upper surface 48 but terminate at a spacing therefrom. Four further vent slots 70 are provided in the surface 48.

Figure 10:
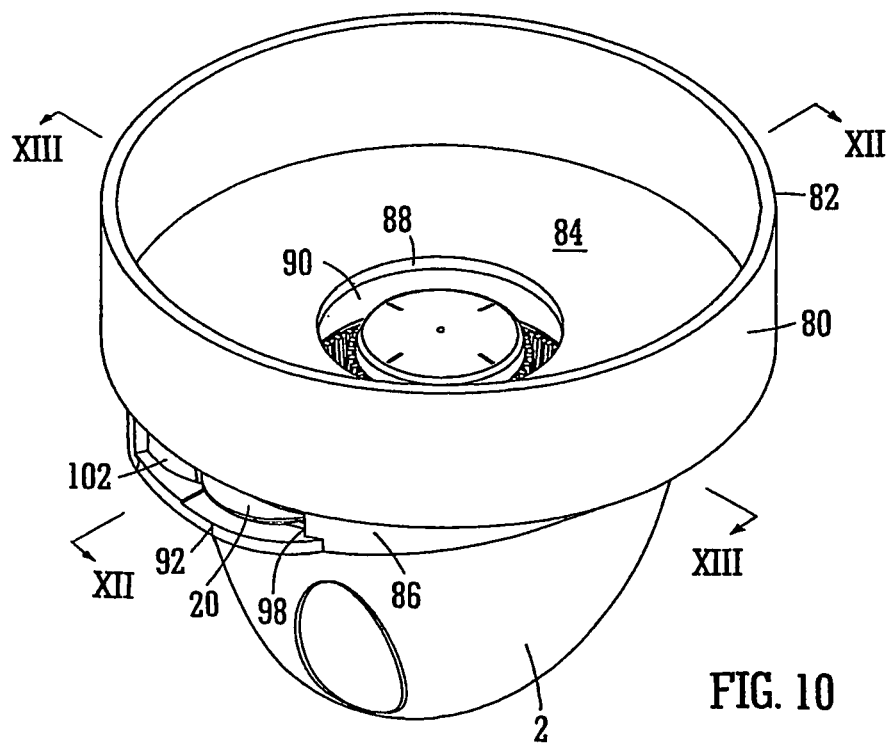
FIG. 10 shows the cartridge of FIG. 1 mounted in a receptacle.
Figure 11:
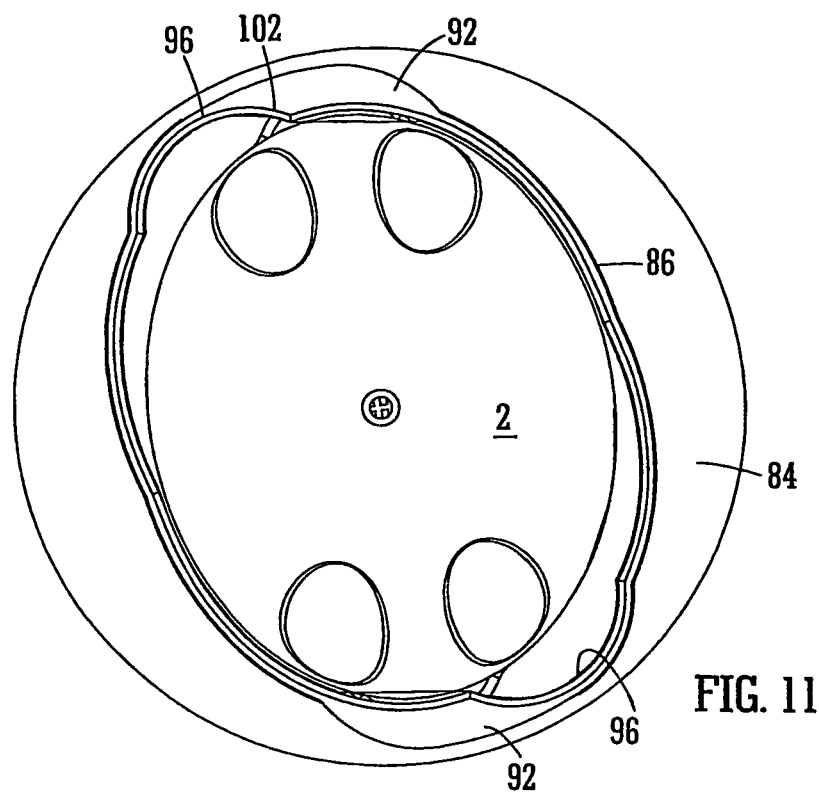
FIG. 11 shows the arrangement of FIG. 10 from below.
Figure 12:
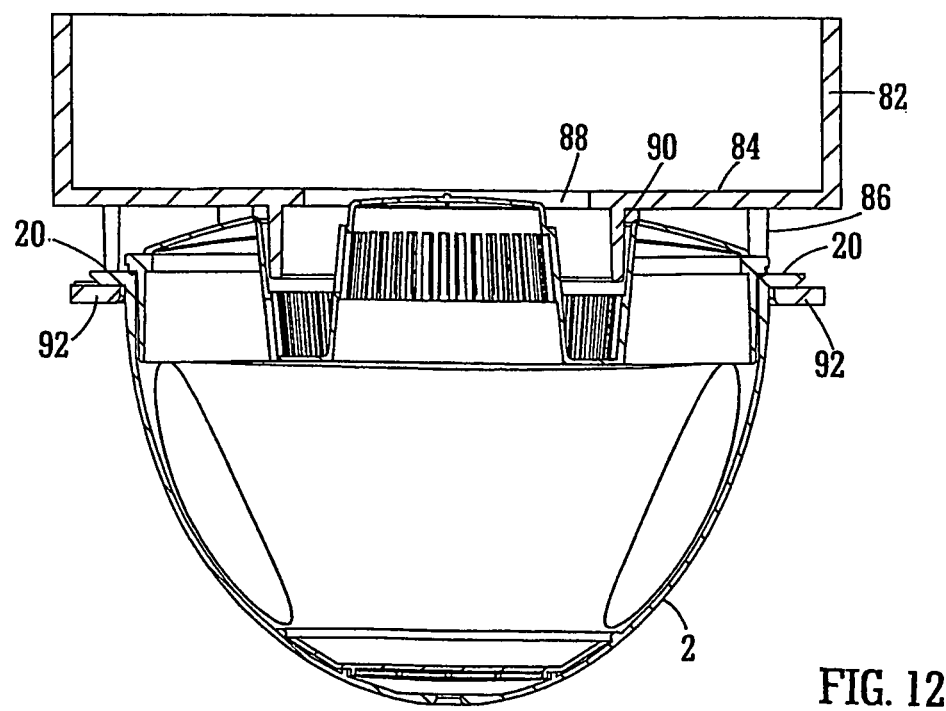
FIG. 12 shows a vertical section along the line XII-XII of FIG. 10.
Figure 13:
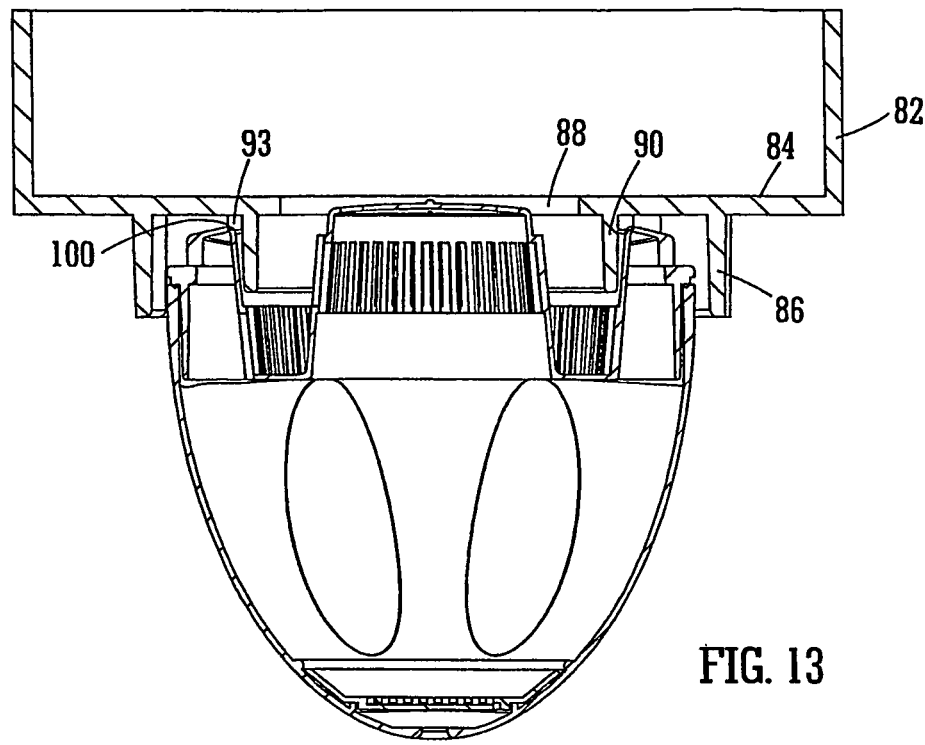
FIG. 13 shows a section along the line XIII-XIII of FIG. 10.

Turning now to FIGS. 10 to 12, a cartridge 2 in accordance with the invention is intended to be received in the bottom of a water receiving receptacle 80. As shown in FIG. 10, this receptacle comprises an outer wall 82, a base 84 and a depending flange 86. An opening 88 is formed centrally in the base 84 and a depending circular lip 90 formed around the opening 88. A circular sealing member 93 is mounted around the upper outer surface of the wall 90. The outer wall 86 is generally elliptical in shape and is formed with outwardly extending flanges 92 at opposed ends.

As can be seen in FIGS. 10, 11 and 12, the flanges 92 receive the mounting lugs 20 of the cartridge 2. In particular, the outer wall has two scalloped regions 96 adjacent the flanges 92 which can receive the lugs 20 which can then be turned in order to position the lugs over the flanges 92 and secure the cartridge 2 in position. The cartridge can be turned until the lug 20 engages an end surface 98 of the wall 86, as shown in FIG. 10.

The act of rotating the cartridge 2 into position seals the cartridge 2 in position. In particular, the corner 100 between the walls 46 and 52 of the cartridge upper surface is brought into sealing engagement with the sealing ring 93. The chamfer 22 of the lug 20 pushes the cartridge 2 upwardly as it rotates over the edge 102 of the flange 92. Depending on the particular shape of the edge of the surface 102, the lug 20 will give different compression characteristics. As can be seen from FIG. 8, the apparent angle of the chamfer 22 varies at different lateral and axial positions along the lug 20, so depending on where the lug first engages the surface 102, a steep ramp or a more prolonged ramp effect will occur. This can be used to give an appropriate compression characteristic for the particular seal used.

As the cartridge 2 is of plastics, and the lugs 20 are displaced from the seal location, a degree of resilience is generated by the lugs 20 maintaining sealing pressure on the seal 93.

It will be seen that the outer wall 52 is tapered such that it guides the cartridge into position over the depending wall 90.

Figure 14:
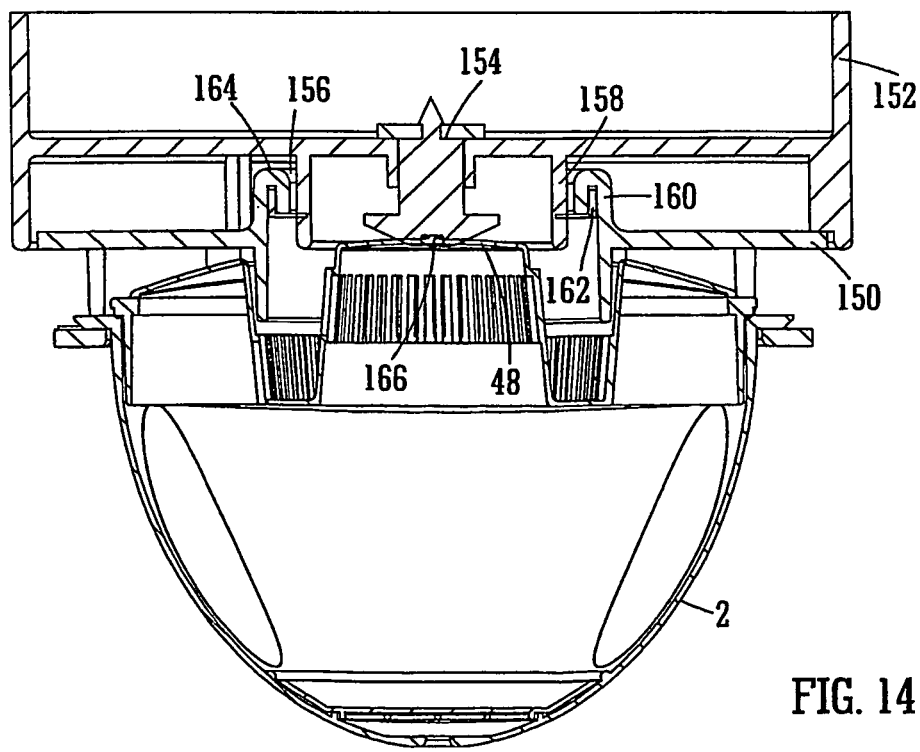
FIG. 14 shows the cartridge of FIG. 1 mounted to a second receptacle.

Turning now to FIG. 14, in this embodiment, the cartridge 2 is mounted to a mount 150 which can, for example, be a mounting member provided in an upper region of a water heating vessel such as a kettle or hot water jug. The mount in this embodiment not only receives the cartridge 2 but also a receptacle 152 which contained water and which has a valve 154 which remains closed until such time as a receptacle 152 is placed down on the mounting plate 150.

In particular, the lower surface of the mount 150 is substantially similar to that of the lower surface of the receptacle in the earlier described embodiment and further details would need not, therefore, be given. However, the mount 150 comprises a central circular opening 156 which receives a downwardly depending wall 158 of the receptacle 152. The opening 156 of the mount 150 is surrounded by an inverted U-shaped wall 160 which mounts within its channel a fin seal 162 which extends radially inwardly. When the receptacle 152 is placed on the mount plate 150, it is guided into position by the curved edges 164 of the wall 160 and a seal is made between the wall 158 and the fin seal 162.

The valve 154 is positioned such that it will not open until a seal is made between the fin seal 162 and wall 158. Once that occurs, the bottom end 166 of the valve contacts the surface 48 of the cartridge 2 forcing the valve member upwardly to allow water to flow from the receptacle into the cartridge 2.

When water is released from either receptacle 152 or receptacle 82 into the cartridge 2 water is prevented from escaping around the upper surface of the cartridge 2 by virtue of the seal 93. Water then flows over the top of the cartridge 2 into the channel 50. Since the water pressure head is greater in the lower region of the channel 50 and since there is a greater opening area in this region, the majority of the flow into the cartridge occurs through the lower outer wall 52. Water will also enter the cartridge through the slots 68 in the inner channel wall 54. However, due to the lower pressure head in this region, and the smaller slot area, the flow in this region will not be so great. This allows air which may be trapped in the cartridge to escape more easily from the cartridge 2 as it is filling. Once the cartridge 2 is substantially filled, any residual trapped air may escape through the vents 70.

The water then flows through the treatment granules contained within the container and out through the grille 10. There will, in fact, be a back pressure in the cartridge due to the restricted opening 16 in the base of the cartridge. This may lead to air becoming trapped around the area of the lower grill 10 which may be detrimental to the flow of water through the cartridge 2. However, since a gap 34 is formed between the grille periphery 28 and the body 6, air which collects within this region can escape upwardly through this gap preventing potential blockages.

Figure 15:
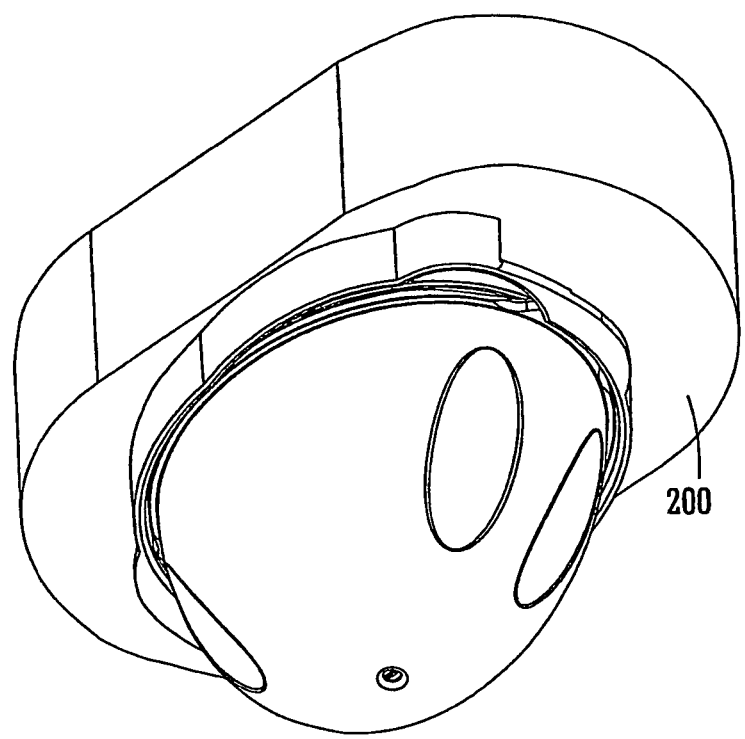
FIG. 15 shows the cartridge of FIG. 1 mounted in a yet further receptacle.

With reference now FIG. 15, this illustrates that a receptacle need not be circular and in fact in certain appliances such as water jugs intended to be stored in refrigerators, this is not desirable. Accordingly, FIG. 15 shows an arrangement in which the water receptacle 200 has a major and a minor access.

Figure 16:
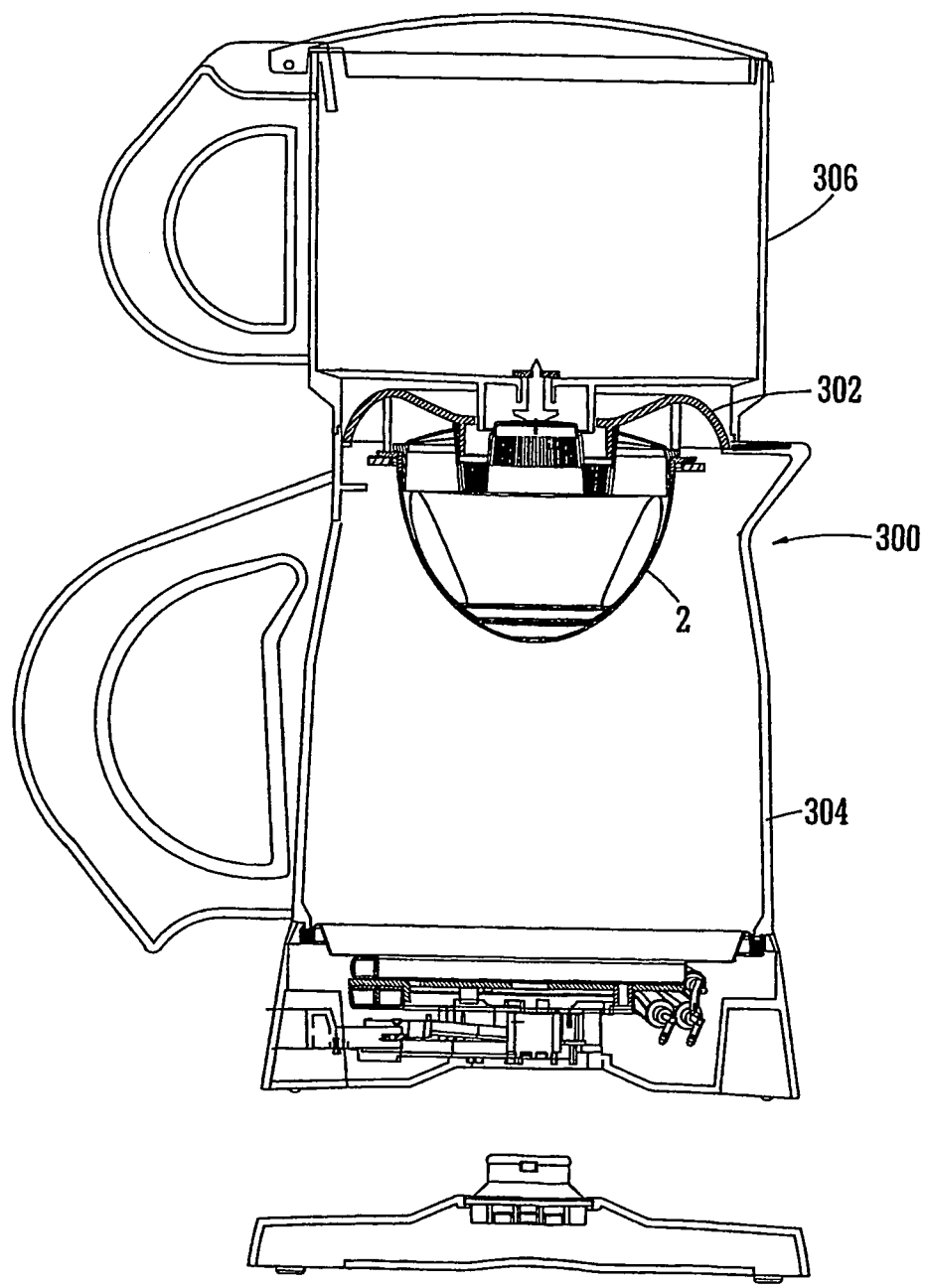
FIG. 16 shows a liquid heating appliance incorporating a cartridge in accordance with the invention.

FIG. 16 shows a cartridge 2 mounted in a cordless liquid heating appliance 300. In this embodiment, the mount for the cartridge 2 is formed in the lid 302 of a liquid heating vessel 304 which receives a hopper 306 for untreated water. The detail of interengagement of the cartridge, mount and hopper is the same as shown in FIG. 14.

With reference to FIGS. 17 to 20, if it is desired to allow only one form of cartridge to be used with one form of receptacle then appropriate keying means may be provided on the cartridge 2. This may be useful, for example, to prevent a cartridge having too slow a flow characteristic being used in a high power heating vessel.

Figure 17:
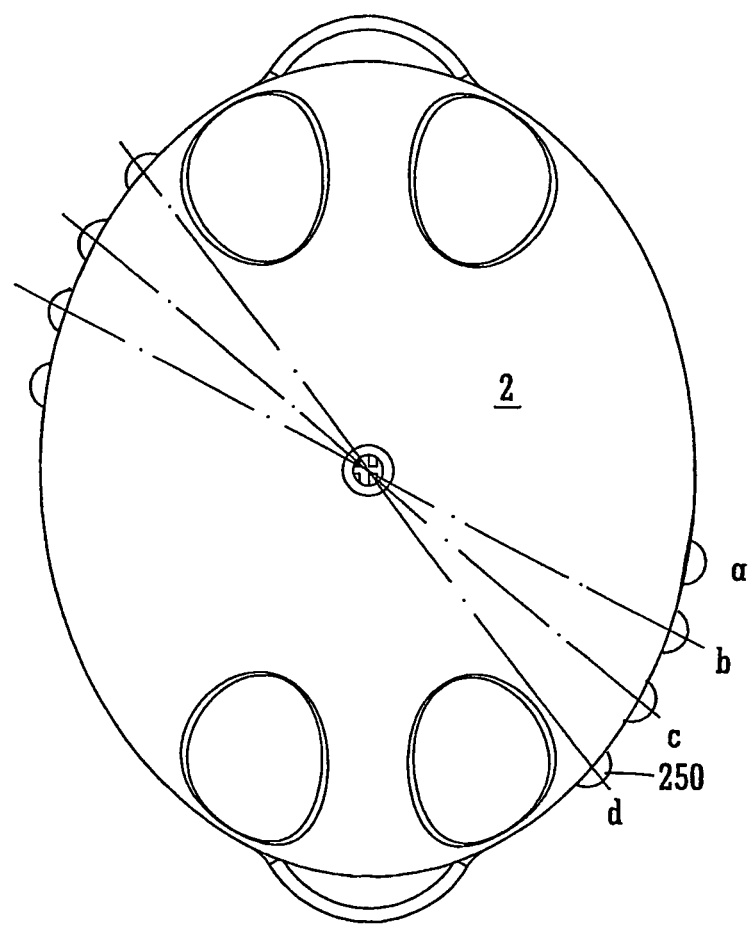
FIGS. 17 to 20 shows various keying arrangements on cartridges.

FIG. 17 shows a first arrangement in which a key 250 may be positioned in positions A, B, C and D on a peripheral part of the cartridge 2. A corresponding opening will be provided in a flange of the receptacle base in order to receive only cartridges which have the key 250 in the appropriate position.

Figure 18:
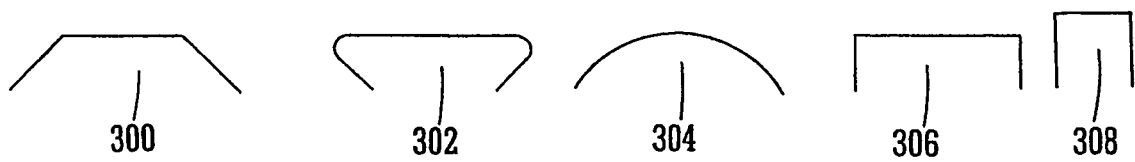
Figure 18:
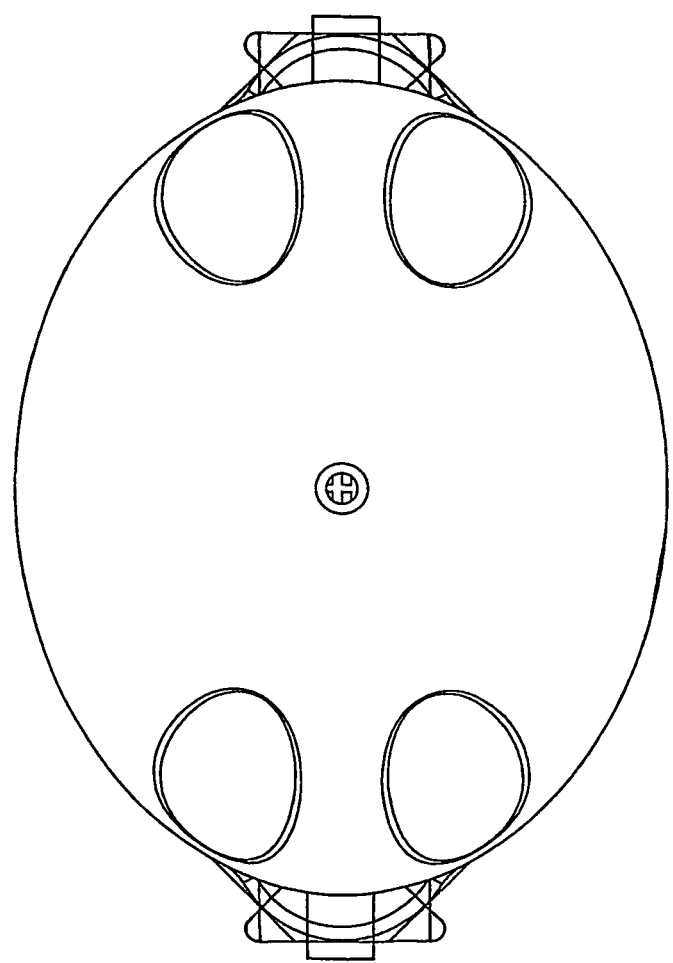

In FIG. 18, a further keying concept is shown in which the shape of the mounting lug may be different for different cartridges. In this case the mounting lug may take a number of different forms, 300,302,304,306 and 308. A correspondingly shaped opening in the wall of the mounting plate or receptacle will be provided for each of these. In this particular instance only key 308 will fit all the openings in the receptacle body and be regarded as a master key.

Figure 19:
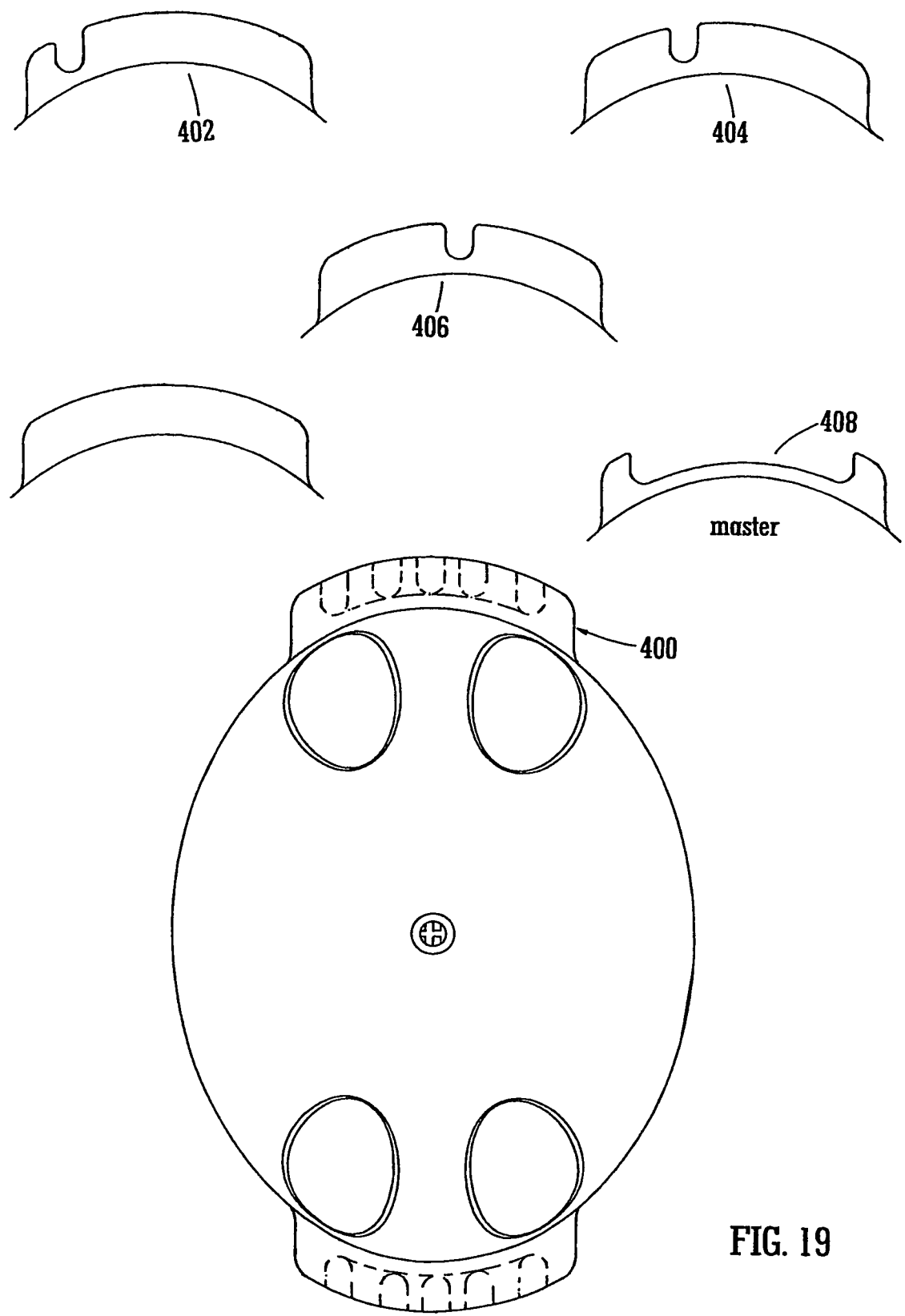

FIG. 19 shows yet a further concept in which the mounting lug 400 may be provided with notches 402,404,406 or 408, as shown, with the corresponding part of the receptacle having corresponding pegs to receive the notches.

Figure 20:
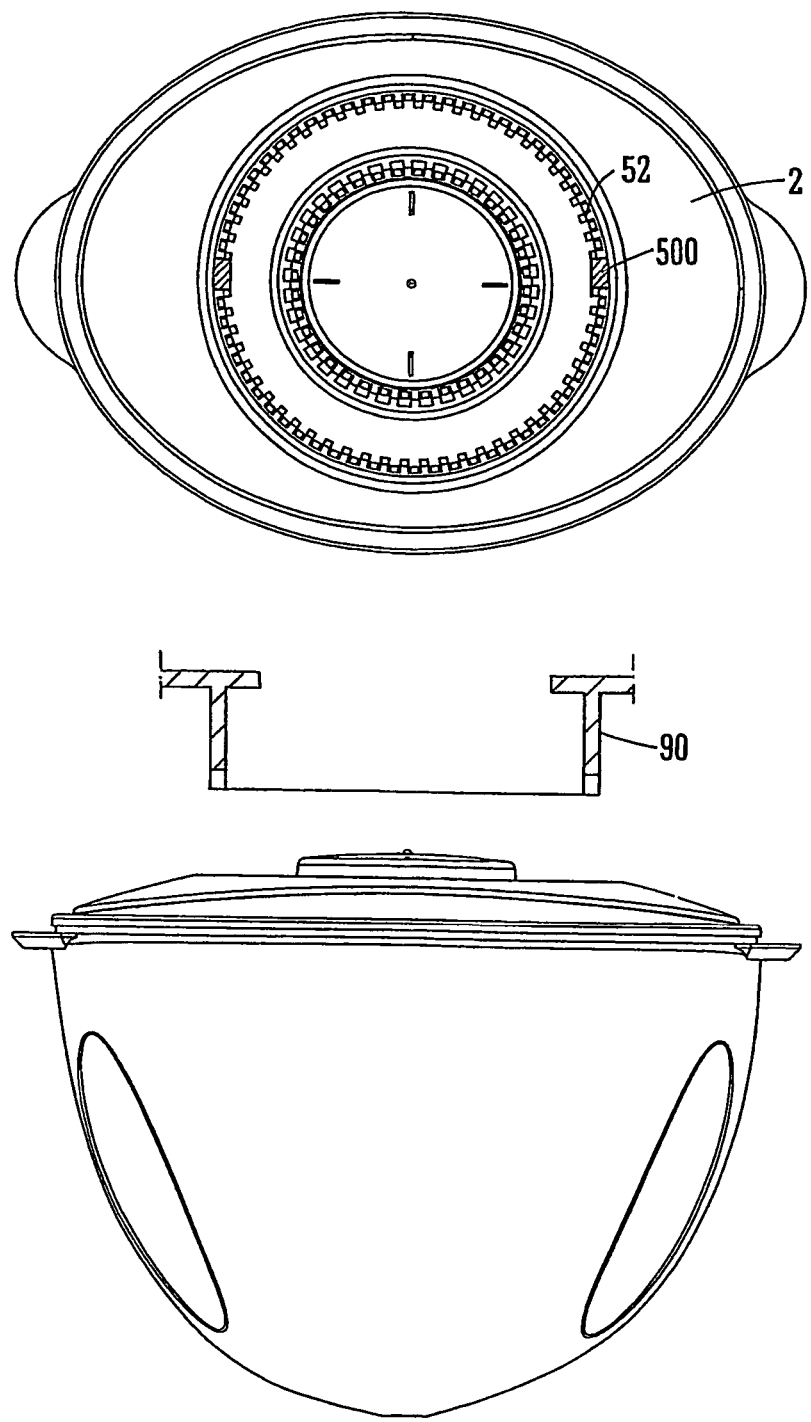

FIG. 20 shows an arrangement in which lugs 500 are provided on the wall 52 of the cartridge 2, with the corresponding wall 90 being provided with cut outs 502 to receive those lugs.

Figure 21:
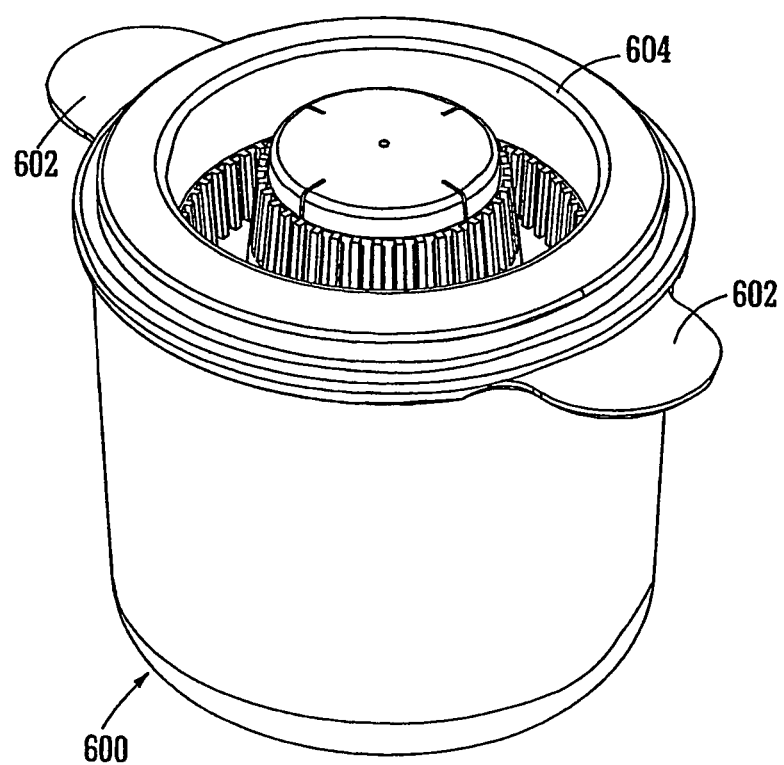
FIG. 21 shows an alternative embodiment of treatment cartridge in accordance with the invention.

FIG. 21 shows a further cartridge in accordance with the invention. In this embodiment, the cartridge 600 is generally circular in cross section, having extended mounting lugs 602 and a circular sealing surface 604. The shape of the lugs and sealing surface are such that the cartridge will fit the mounting for the elliptical cartridge 2 discussed above.

Other shapes of cartridge body are possible. For example, a rectangular section body could be suitably blended into the elliptical mounting part of the cartridge shown in FIG. 1.

Figure 22:
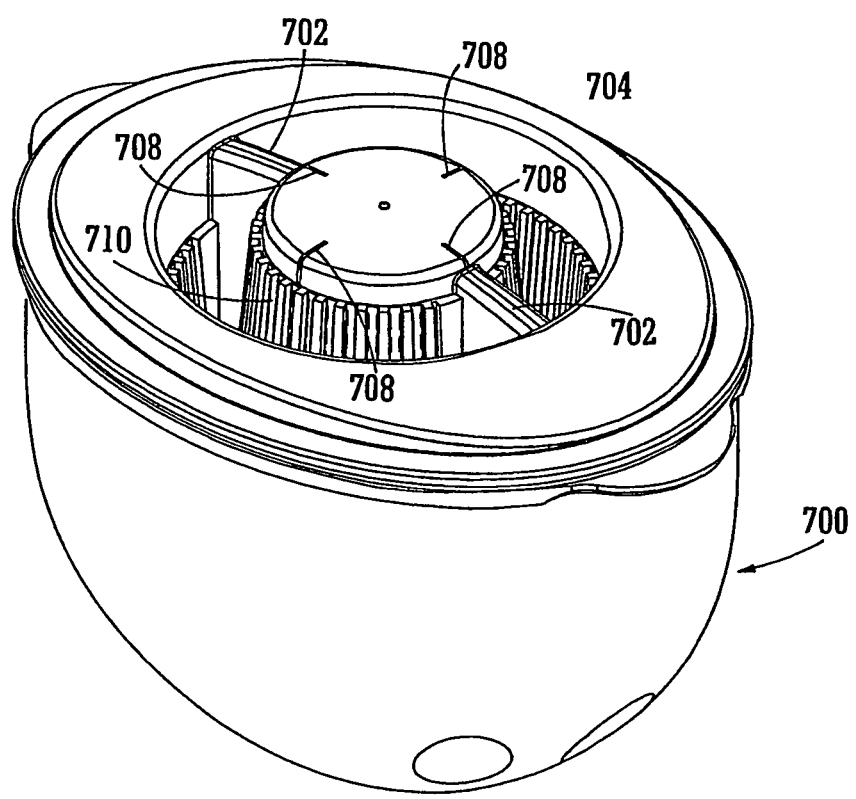
FIG. 22 shows a further embodiment of the invention.

FIG. 22 shows a further cartridge in accordance with the invention. In this embodiment, the cartridge 700 is substantially the same as that shown in FIG. 1. However, in this embodiment, a pair of ribs 702 extends across the annular channel 704 in the cartridge top. The ribs 702 extend upwardly from the base of the channel and are hollow so as to allow trapped air to move towards the vents 708 from the region under the base of the channel and the region radially outwardly of the channel. In this embodiment also, the slots 710 in the inner wall of the channel extend to the base of the channel.

With this embodiment, the depending wall 90 of the base 84 onto which the cartridge fits can be reduced in height or removed altogether at least in the region of the ribs 702 to allow the cartridge to be mounted in position.

In the various embodiments described above the cartridge body 6 and preferably the entire cartridge 2 is made of a plastic which is both heat resistant and resistant to gamma radiation, such as Samsung HJ730+ and Basell Moplen HP371(Gamma Stabilized) to prevent discoloring of the plastic material during use. However the cartridge body 6 at least could also be made from metal, for example, with the cap made of plastics, as before.

The invention claimed is:

1. A mounting part of or for a water treatment cartridge, said mounting part having a generally circular sealing surface, major and minor axes in a horizontal cross-section wherein the major axis is longer than the minor axis, and mounting lugs arranged at opposed ends of the mounting part along an elongate direction generally aligned with the major axis, wherein the sealing surface is arranged radially inward of the mounting lugs and is formed by at least a portion of an inwardly facing, downwardly depending wall that forms a radially outer wall of an annular channel for receiving water that can pass through the cartridge by the force of gravity.

2. A water treatment cartridge having a mounting part as claimed in claim 1 as an integral part thereof or a separate element.

3. Apparatus as claimed in claim 2 wherein the cartridge comprises a cartridge body whose upper end is closed by a cap.

4. Apparatus as claimed in claim 2 wherein the cartridge comprises a cartridge body and a grille provided at a bottom of the cartridge body.

5. Apparatus as claimed in claim 4 wherein the grille retains treatment particles away from a restricted opening in a base of the cartridge body.

6. Apparatus as claimed in claim 5 wherein the grille is snap fitted into the container cartridge body which is provided with suitable retaining means.

7. Apparatus as claimed in claim 6 wherein the suitable retaining means comprises a retaining lip formed on its inside surface.

8. Apparatus as claimed in claim 4 wherein the grille is formed with an upwardly dished outer portion that collects air to the grille surface and which when arranged within the cartridge body is spaced from the cartridge body such that air escapes between the cartridge body and the dished portion of the grille.

9. Apparatus as claimed in claim 2 wherein means are provided on the cartridge which prevent the cartridge being used in an inappropriate appliance.

10. Apparatus as claimed in claim 2 wherein the cartridge has associated with it a counter used to indicate a degree of usage of the cartridge.

11. Apparatus as claimed in claim 10 wherein the cartridge is provided with means which, upon rotation of the cartridge into or out of position engage with an actuator for resetting a usage counter.

12. Apparatus as claimed in claim 2 wherein the cartridge also comprises a particle filter.

13. Apparatus as claimed in claim 1 wherein the cartridge is generally elliptical in horizontal cross-section.

14. Apparatus as claimed in claim 1 wherein the mounting lugs are planar and extend at least 15° around the periphery of the cartridge.

15. Apparatus as claimed in claim 1 wherein the mounting lugs are arcuate in shape.

16. Apparatus as claimed in claim 1 wherein the mounting lugs mount the cartridge in a bayonet type fitting.

17. Apparatus as claimed in claim 1 wherein a lower edge of each lug periphery is chamfered such that as the mounting lug is rotated onto a receiving surface, and the chamfer acts to cam the cartridge into sealing engagement with a seal.

18. Apparatus as claimed in claim 17 wherein the chamfer profile is substantially the same around the entire lug periphery.

19. Apparatus as claimed in claim 1 wherein the cartridge, or at least the lugs thereof, are made from a plastics material.

20. Apparatus as claimed in claim 19 wherein the plastics material is resistant to degradation by gamma radiation.

21. Apparatus as claimed in claim 19 wherein the plastics material comprises a heat resistant plastics material.

\* \* \* \* \*